No. 744,788. PATENTED NOV. 24, 1903.
W. NOBLE & B. L. WIGTON.
HOSE PIPE COUPLING.
APPLICATION FILED FEB. 2, 1903.
NO MODEL.
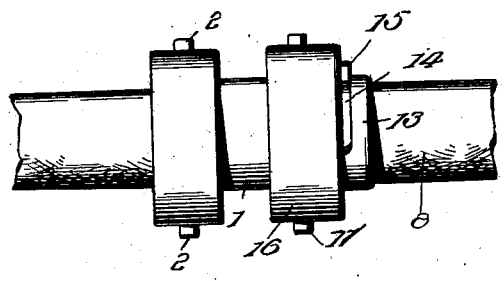
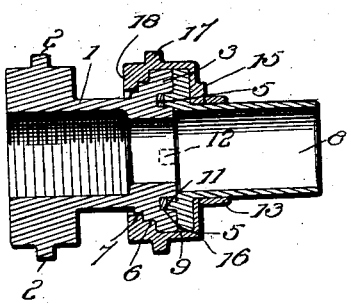
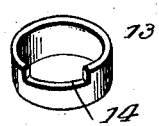
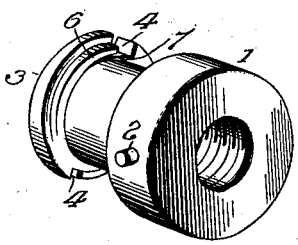
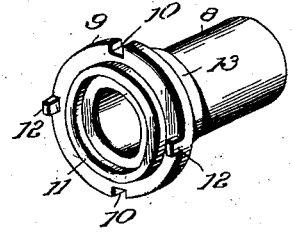
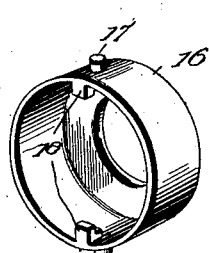
Inventors
Willie Noble
Burton L. Wigton No. 744,788.

Patented November 24, 1903.

UNITED STATES PATENT OFFICE.

WILLIE NOBLE AND BURTON L. WIGTON, OF WEST UNION, WEST VIRGINIA.

HOSE-PIPE COUPLING.

SPECIFICATION forming part of Letters Patent No. 744,788, dated November 24, 1903.

Application filed February 2, 1903. Serial No. 141,529. (No model.)

*To all whom it may concern:*

Be it known that we, WILLIE NOBLE and BURTON L. WIGTON, citizens of the United States, residing at West Union, in the county of Doddridge and State of West Virginia, have invented certain new and useful Improvements in Hose-Pipe Couplings, of which the following is a specification.

This invention provides a joint or coupling for pipe-sections, being chiefly designed for hose to admit of connecting the same either to a hydrant or other water-fixture or joining sections when required to increase the length of the hose for reaching any desired point.

The chief characteristic of the coupling is to dispense with threads and to enable the coupling to be quickly effected and the parts disconnected, as desired.

The coupling comprises flanged members having corresponding notches in opposite edges of the flanges and interlocking projections to cause the members to turn as a unit and a union for connecting the sections and fitted to one by a swivel-joint and provided with inner lugs to ride upon cam portions provided upon the flange of the other member, whereby the sections of the coupling are drawn together.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the acccompanying drawings, in which—

Figure 1 is an elevation of a coupling embodying the invention. Fig. 2 is a central longitudinal section thereof. Fig. 3 is a perspective view of one of the coupling members. Fig. 4 is a similar view of the other coupling member. Fig. 5 is a perspective view of the union. Fig. 6 is a detail perspective of the collar which facilitates the connection of the sections.

Corresponding and like parts are referred to in the following description and indicated in all the views of the drawings by the same reference characters.

The coupling members or sections are of similar construction and are flanged at their inner ends. The member or section 1, provided with oppositely-extended studs 2, is flanged at one end, as shown at 3, the same having notches 4 in opposite sides of the flange to admit of clearing the inwardly-extended lugs of the union when coupling or uncoupling the sections. An annular groove is formed in the outer side of the flange and receives a gasket 5 or packing-ring of rubber, leather, or like material to insure the formation of a tight joint between the sections or members of the coupling when joined. The rear face or side of the flange 3 is inclined to form a cam for coöperation with the aforesaid lugs of the union to admit of drawing the sections together. The cam extends from one notch toward the other, thereby providing, in effect, oppositely-disposed coöperating cams, whereby the members or coupling-sections are uniformly drawn together. The cam portions are stepped, so as to provide, in effect, parallel cams 6 and 7, whereby the life of the coupling is increased and the same made more stable.

The member or section 8 of the coupling is flanged at one end, as shown at 9, the same having notches 10 in opposite edges to admit of passing the flanged portion into the rim portion of the union when assembling the parts. An annular rib 11 projects from the outer face of the flange 9 to enter the groove of the flange 3 and bear against the packing ring or gasket 5. Lugs 12 project from the face of the flange 9 to interlock with the flange 3 of the member 1 by entering the notches 4 thereof, whereby the two members or parts of the coupling turn as a unit with reference to the union. After the member or section has been fitted to the union it is prevented from displacement by having a collar 13 secured thereto either by means of a clamp-screw or analogous fastening. The collar 13 is cut away upon the edge adjacent to the union for about half its circumferential length, as shown at 14, to receive a lug 15, projected from the rear or outer side of the union, whereby the latter has a limited rotary movement with reference to the members of the coupling.

The union 16 is of ordinary formation, comprising a rim portion having an inner flange at one end to be confined between the collar 13 and flange 9, so as to make swivel connection with the member 8, upon which it is mounted. Studs 17 project from opposite sides of the union for reception of a hose wrench or spanner, whereby the coupling and uncoupling of the joint is effected in the accustomed way. Lugs 18 extend inward from the rim portion of the union at diametrically opposite points and are adapted to engage with the cams of the member or section 1. Said lugs 18 have two engaging shoulders to make contact with the cams 6 and 7.

The members or sections of the coupling are adapted to be connected to the parts to be joined in the usual way and are adapted to be coupled by passing the flanged end of the member or section 1 into the rim portion of the union 16 and turning the parts to cause the cams to ride under the lugs 18, whereby the members or complementary parts of the coupling are drawn together, as will be readily comprehended. Before fitting the member 1 into the union the latter is turned until the lugs 18 register with the lugs 12, after which the member 1 is inserted into the rim portion of the union, its notches 4 clearing the lugs 18 and engaging with the lugs 12, whereby the two members become interlocked and are prevented from independent rotation during turning of the union to complete the coupling and draw the members or sections 1 and 8 together.

Having thus described the invention, what is claimed as new is—

1. A coupling comprising flange parts, one of the parts having oppositely-disposed notches and coöperating cams extended from the respective notches, a union connected with the other part of the coupling member by means of a swivel-joint and having inwardly-extended lugs to pass through the notches of the first-mentioned coupling member and engage with the cams thereof, lugs projected from the second coupling member and adapted to interlock with the notches of the first-mentioned member to cause said members to turn as a unit with reference to the union, and means for limiting the movement of the union, whereby the latter-mentioned lugs are disposed so as to facilitate the interlocking action of the same with the notches.

2. In a coupling, corresponding members, one of the members having opposite notches and stepped cam portions extended in opposite directions from the said notches, and a union mounted upon the other coupling member and provided with inwardly-extended lugs having a series of stepped shoulders for coöperation with the stepped cam portions of the aforementioned coupling member, substantially as specified.

3. A coupling comprising complementary members flanged at their inner ends and having notches in opposite edges of the flanges, one of the members having cams extended from the notches of its flange, a groove and rib in the meeting faces of the two flanges, said groove receiving a packing, a union mounted upon the other member and having a lug upon its outer or rear side, and inwardly-extended lugs upon its rim portion, a collar secured to the member fitted to the union and having the edge portion adjacent to the union cut away to admit of a limited play thereof, and lugs extended from the face of the flange of the coupling member applied to the union and adapted to enter the notches of the flange having the cam portions, substantially as described.

In testimony whereof we affix our signatures in presence of two witnesses.

WILLIE NOBLE. [L. S.]
BURTON L. WIGTON. [L. S.]

Witnesses:
U. GRANT SUMMERS,
WALTER L. KINNEY.